United States Patent [19]

Tanaka et al.

[11] Patent Number: 5,361,316
[45] Date of Patent: Nov. 1, 1994

[54] OPTICAL FIBER LASER DEVICE FOR TRANSMITTING A PULSE LASER BEAM

[75] Inventors: Akio Tanaka, Chiba; Toru Hirano, Hamamatsu; Masami Ohsawa, Higi, all of Japan

[73] Assignees: Lederle (Japan) Ltd., Tokyo; Hamamatsu Photonics K.K., Shizuoka; Moritex Corporation, Tokyo, all of Japan

[21] Appl. No.: 155,918

[22] Filed: Nov. 23, 1993

Related U.S. Application Data

[63] Continuation-in-part of Ser. No. 26,305, Mar. 4, 1993, abandoned.

[30] Foreign Application Priority Data

Mar. 5, 1992 [JP] Japan .................. 4-024623[U]

[51] Int. Cl.⁵ .................................. G02B 6/32
[52] U.S. Cl. .......................... 385/35; 385/119; 385/902

[58] Field of Search .............. 372/6; 385/33–35, 385/116, 117, 119, 902

[56] References Cited

U.S. PATENT DOCUMENTS

| | | | |
|---|---|---|---|
| 4,772,093 | 9/1988 | Abele et al. | 385/119 |
| 4,917,014 | 4/1990 | Loughry et al. | 102/201 |
| 4,989,944 | 2/1991 | Tholen et al. | 385/35 |
| 5,009,482 | 4/1991 | Lincoln | 385/35 |
| 5,190,536 | 3/1993 | Wood et al. | 385/35 X |

*Primary Examiner*—John D. Lee
*Attorney, Agent, or Firm*—Wenderoth, Lind & Ponack

[57] ABSTRACT

An optical fiber laser device, used as a pulse laser device, has a spherical lens made of optical glass having a refractive index of 2 or less. The spherical lens is provided on an extreme end of an optical fiber which guides a pulse laser beam. An object side of the spherical lens is projected externally of a base housing the spherical lens therein.

5 Claims, 4 Drawing Sheets

(a)

(b)

OPTICAL FIBER LASER DEVICE FOR TRANSMITTING A PULSE LASER BEAM

This application is a continuation-in-part of now abandoned application Ser. No. 08/026,305, filed on Mar. 4, 1993 abandoned.

BACKGROUND OF THE INVENTION AND PRIOR ART

The present invention relates to a laser device, and more particularly to an optical fiber laser device used for a pulse laser conducting device.

As a therapy in the body cavity, there is known a therapy using a laser beam which is called photodynamic therapy. This therapy uses a laser device, particularly a pulse laser conducting device, to perform a treatment by applying a laser optical energy compressed in a pulse state into the body cavity through an optical fiber. In this therapy, however, the optical energy partly becomes a shock wave, and the shock wave causes splashing of tissue fluid. The tissue fluid becomes firmly adhered and bonded to a lens at an extreme end of the optical fiber and contaminates the surface of the lens. This poses a problem in that it is very difficult to remove the contamination on the lens.

FIG. 1 shows the construction of an extreme end portion of a conventional optical fiber laser device used for laser therapy such as photodynamic therapy. The conventional optical fiber laser device comprises an optical fiber 1, a base 2 for housing therein a lens, a cylindrical GRIN lens 3, and a pawl 4 for preventing the GRIN lens from falling out of the base 2, the pawl constituting a part of the base 2.

In the process of the laser therapy such as the photodynamic therapy, it is often necessary to uniformly irradiate a laser beam on the affected part in the body cavity. In this case, it is necessary to provide an adequate lens on the extreme end of the optical fiber. Conventionally, a cylindrical GRIN Lens 3 known as a "SELFOC" lens is used, which is encased in the base 2 at the extreme end portion of the optical fiber 1 as shown in FIG. 1.

However, since in the above-described conventional construction, the pawl 4 for preventing lens 3 from falling out is present, the baked contamination, on the surface of the lens cannot be cleaned and wiped off. In fact, even if the lens surface is cleaned immediately after being contaminated by a method such as ultrasonic cleaning, the contamination can hardly be removed.

SUMMARY OF THE INVENTION

A first object of the present invention is to provide a construction which reduces contamination of a lens at an extreme end of an optical fiber laser device used for photodynamic therapy using a pulse laser, and which enables the contamination to be easily cleaned and wiped off when it occurs.

A second object of the present invention is to provide a construction which uses an inexpensive lens instead of an expensive GRIN lens to obtain an optical effect equal thereto, in which the lens is not broken by a pulse laser, which is highly economical and which is capable of adjusting a light irradiation spot size without changing parts.

For achieving the aforementioned objects, the present invention provides a construction in which a spherical lens made of optical glass having a refractive index of 2 or less is provided on the extreme end portion of an optical fiber which guides a pulse laser beam, and an objective side of the spherical lens is projected externally of a base housing the spherical lens therein.

According to the construction of the present invention, a recess is not formed between a stop pawl and the spherical lens unlike the prior art, and the lens is projected from the base, thus making the removal of contamination by wiping easy. Further, there is an advantage in that, by adjusting the mutual relation between the focal position of the spherical lens and the end position of the optical fiber, the light irradiation spot can be adjusted without changing parts. In addition, since the spherical lens is available at a cost lower than that of the conventional GRIN lens, the construction is highly economical. There is a further feature in that no breakage occurs in the spherical lens due to the pulse laser beam.

DESCRIPTION OF THE PREFERRED EMBODIMENTS

Figure 1:
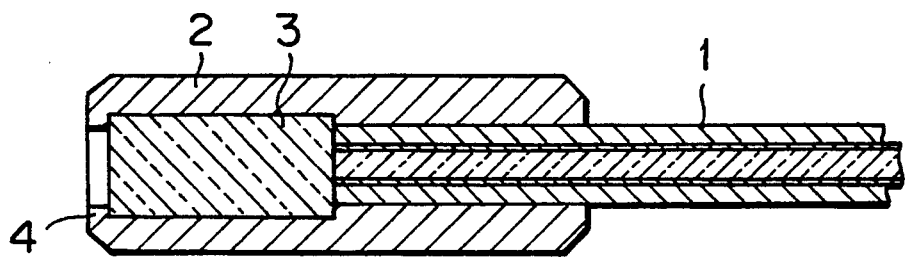
FIG. 1 is a sectional view of a conventional, optical fiber laser device.
Figure 2:
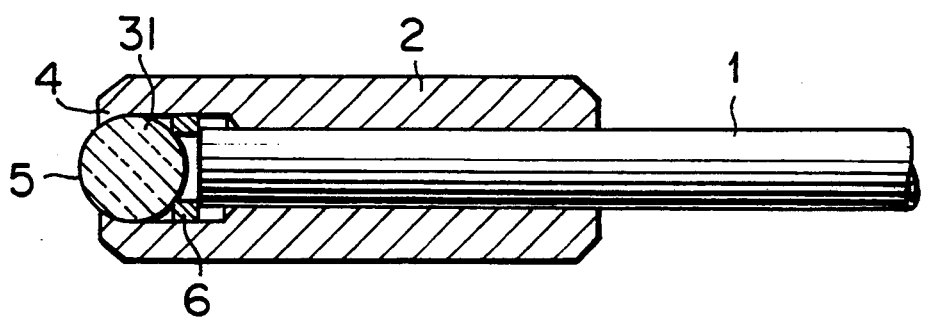
FIG. 2 is a sectional view of a first embodiment of the present invention.

FIG. 2 shows a first embodiment of the present invention, used for laser therapy such as photodynamic therapy. Reference numeral 1 designates an optical fiber, 2 a base for housing a lens 31 therein 4 a pawl of a spherical lens holder and 6 a lens holder on the interior of the base 2. An objective side 5 of the spherical lens 31 can be easily cleaned and wiped off.

Figure 3:
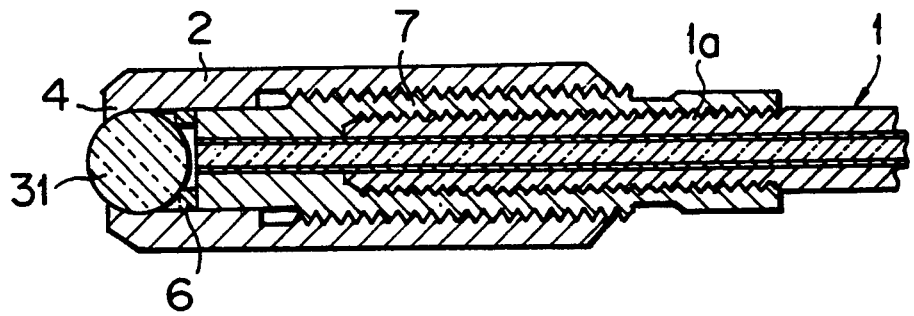
FIG. 3 is a sectional view of a second embodiment of the present invention.

FIG. 3 shows a second embodiment of the present invention, wherein an internal base 7, threadedly engaged with the base 2 is provided. The optical fiber 1, threadedly engaged with the internal base 7, is rotated and adjusted to adjust the focal position of the spherical lens 31 and the relative position of an end of the optical fiber so as to be able to adjust the outgoing pattern of the laser beam and the light radiation spot size.

In FIG. 3, reference numeral 1a designates a protective coating resin layer of the optical fiber 1. The surface of the protective coating resin layer is formed with threads engaged with threads on the internal surface of the internal base 7. An adhesive such as an epoxy adhesive is coated on the thread portions, and after coating they are threadedly engaged. After the adhesive has hardened, a rigid bonding between the internal base 7 and the optical fiber 1 is obtained.

In this embodiment, the spherical lens 31 comprises a spherical lens having a refractive index of 1.516 and a diameter of 1.0 mm by BK-7 Optical Glass, and the optical fiber 1 comprises an optical fiber having a core diameter of 400 µm, HN-G-FB400 sold by Toray Co., Ltd. The surface on the objective side of the spherical lens 31 is projected from the base 2. It has been confirmed that the surface can be easily cleaned and wiped off by an absorbent cotton immersed with a solvent or the like, the removal of contamination had been sufficiently conducted, and the spherical lens is not broken by the pulse laser beam.

Figure 4:
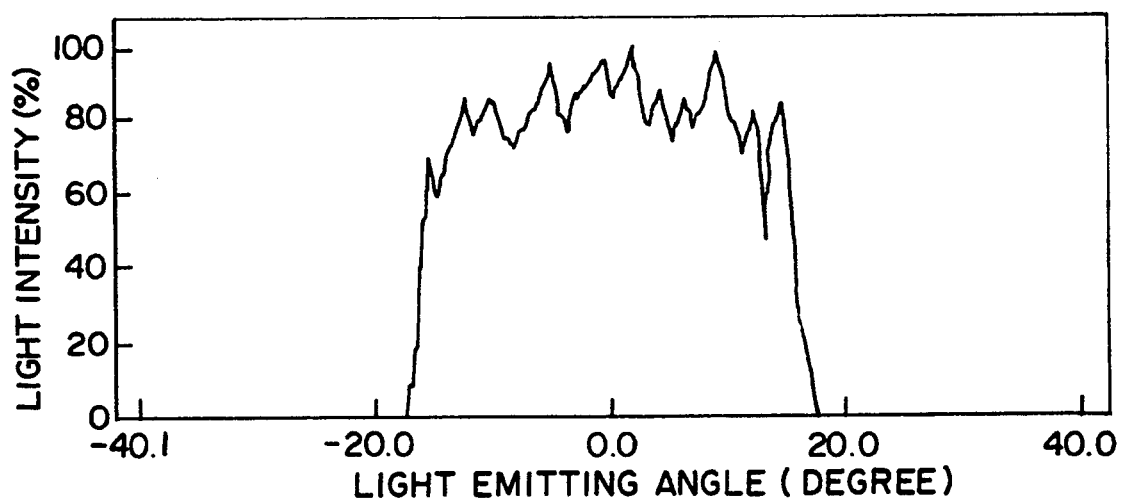
FIGS. 4(a) and 4(b) show laser beam outgoing laser beam patterns from optical fiber laser devices of the present invention and the prior art, respectively.
Figure 4:
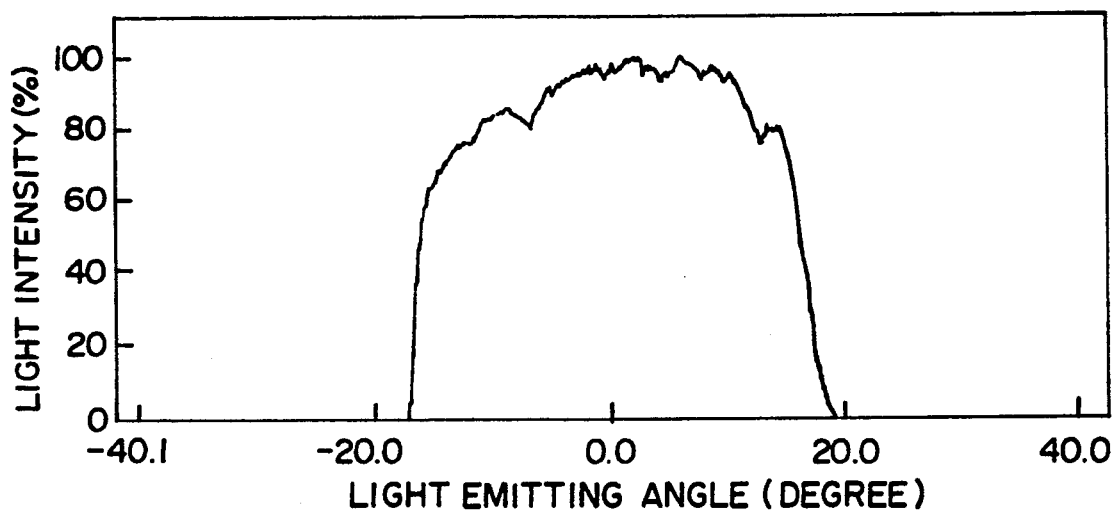

FIG. 4(a) shows an outgoing laser pattern measured by inputting an excimer dye laser having a wavelength of 628 nm and a 6 mj/pulse into the optical fiber laser device according to the second embodiment and providing a detector of a far field optical power pattern measuring device at a position 65 mm from the extreme end.

FIG. 4(b) shows an outputting laser pattern, measured under the same conditions as those described above, for a conventional optical fiber device using a GRIN lens. As will be apparent from the comparison between FIG. 4(a) and FIG. 4(b), an optical fiber laser guide has a satisfactory outgoing laser pattern.

Figure 5:
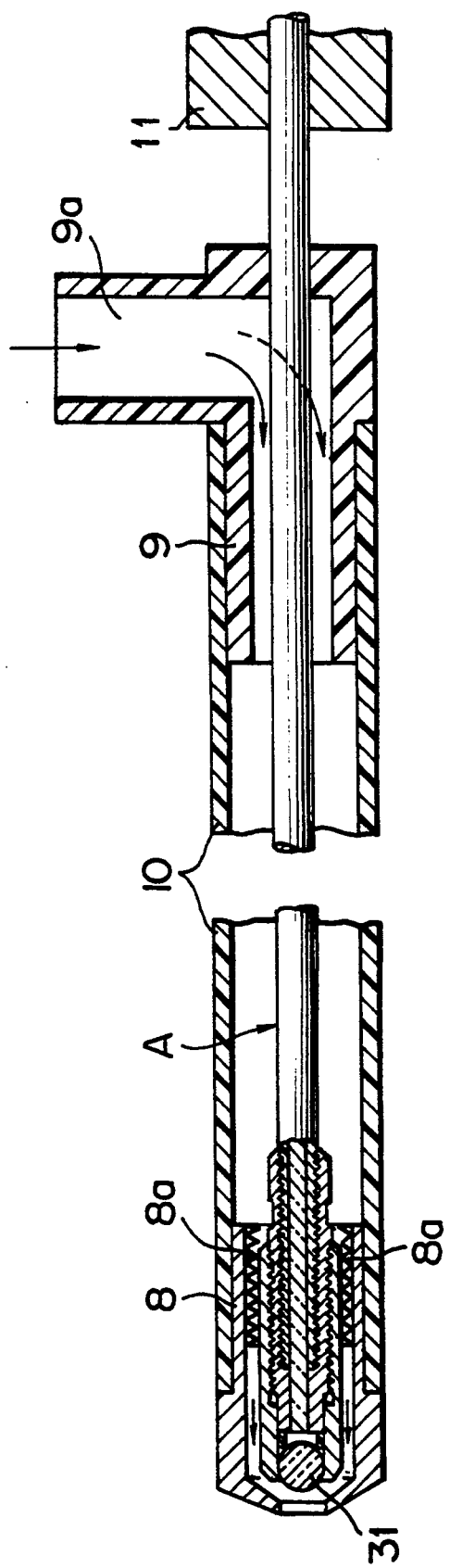
FIG. 5 is a sectional view of a third embodiment of the present invention.

FIG. 5 shows a third embodiment of the present invention, which provides an anti-contamination construction using a fluid such as air.

That is, in the third embodiment shown in FIG. 5, a flexible tube 10 is placed over an optical fiber laser device A, having a construction similar to that of the embodiment shown in FIG. 3, through separators 8 and 9.

In the embodiment, as the flexible tube 10 there is used a flexible tube having an inside diameter of 1.3 mm and an outside diameter of 1.7 mm and made of tetrafluoroethylene plastic known as Teflon (a registered trademark). The separator 8 is provided with a suitable number of fluid flowing grooves 8a, and the separator 9 is made of polypropylene plastic and formed with a fluid inlet 9a.

Clean air is introduced through the fluid inlet 9a at a speed of 50 ml/min, and an excimer dye laser having a wavelength of 628 nm and a 6 mj/pulse is incident on the optical fiber 1. An experiment was conducted at a position close to the liver of a raw swine in a model-like manner. As a result, there was found the effect that the contamination of the surface of the spherical lens due to tissue fluid is relatively less than the case where no air blowing is present.

The optical fiber laser device for therapy such as photodynamic therapy is often utilized in such a manner that the device is inserted through a hole of the forceps of an endoscope to perform the treatment while observing the endoscope. Therefore, it is convenient that the separator 9, which is a base for introducing a fluid into the flexible tube 10, is in proximity to a base 11 from which a laser beam is incident on the optical fiber portion. In practice, it is preferable that the base 11 from which the laser beam is incident on the optical fiber portion is integral with the separator 9.

Air, water and other chemically inactive fluids, which pass through a clearance between the flexible tube 10 and the optical fiber 1 and blow out along the periphery of the spherical lens at the extreme end of the optical fiber laser device A, flow over the surface of the outwardly projected spherical lens 31. As consequence, the contamination of the spherical lens 31 due to the humor flown or tissue fluid by the irradiation of the laser light is materially prevented. Since the fluid is preferably introduced only during the laser irradiation therapy, a valve is installed to adjust the flow rate of the fluid.

While in the forementioned embodiments an illustration has been made of only the case where a spherical lens is used, it is obvious that a function and effect similar to those described above can be obtained even if a conventional convex lens, including an aspherical lens, is used instead of a spherical lens.

As described above, according to the present invention, there can be provided an optical fiber laser device which can easily remove contamination adhered to an objective lens and in which the objective lens is difficult to be contaminated.

Further, when an optical lens, whose refractive index is two or more, is used as a spherical lens, the focal point of a pulse laser beam is positioned within the spherical lens. Therefore, the spherical lens is often broken by the energy of the pulse laser beam. However, when a spherical lens is produced from an optical glass whose refractive index is two or less, the focal position of the pulse laser beam is external of the spherical lens. Therefore, the pulse laser beam does not break the spherical lens.

For better understanding, the change in the focal position caused by the refractive index will be described hereinbelow with reference to FIG. 6.

The formula for a thin-wall lens in air is represented by the following:

$$\frac{1}{f} = (n-1)\left(\frac{1}{r_1} - \frac{1}{r_2}\right) \tag{1}$$

where n is the refractive index, and $r_1$ and $r_2$ are the radius of curvature of both curved surfaces of the lens.

However, in the case of a thick-wall lens, such as a ball lens as in the present invention, the lens is represented by the following formula:

$$\frac{1}{f} = (n-1)\left(\frac{1}{r_1} - \frac{1}{r_2} + \frac{n-1}{n} \times \frac{d}{r_1 r_2}\right) \tag{2}$$

where d is the thickness of lens. If $r_1 = D/2$, $r_2 = -D/2$, and $d = D$, then the formula (2) is rewritten as follows:

$$\begin{aligned}\frac{1}{f} &= (n-1)\left(\frac{2}{D} + \frac{2}{D} - \frac{n-1}{n} \times \frac{4}{D}\right) \\ &= \frac{n-1}{n} \times \frac{4}{D} \\ \therefore f &= \frac{n}{n-1} \times \frac{D}{4}\end{aligned} \tag{3}$$

Figure 6:
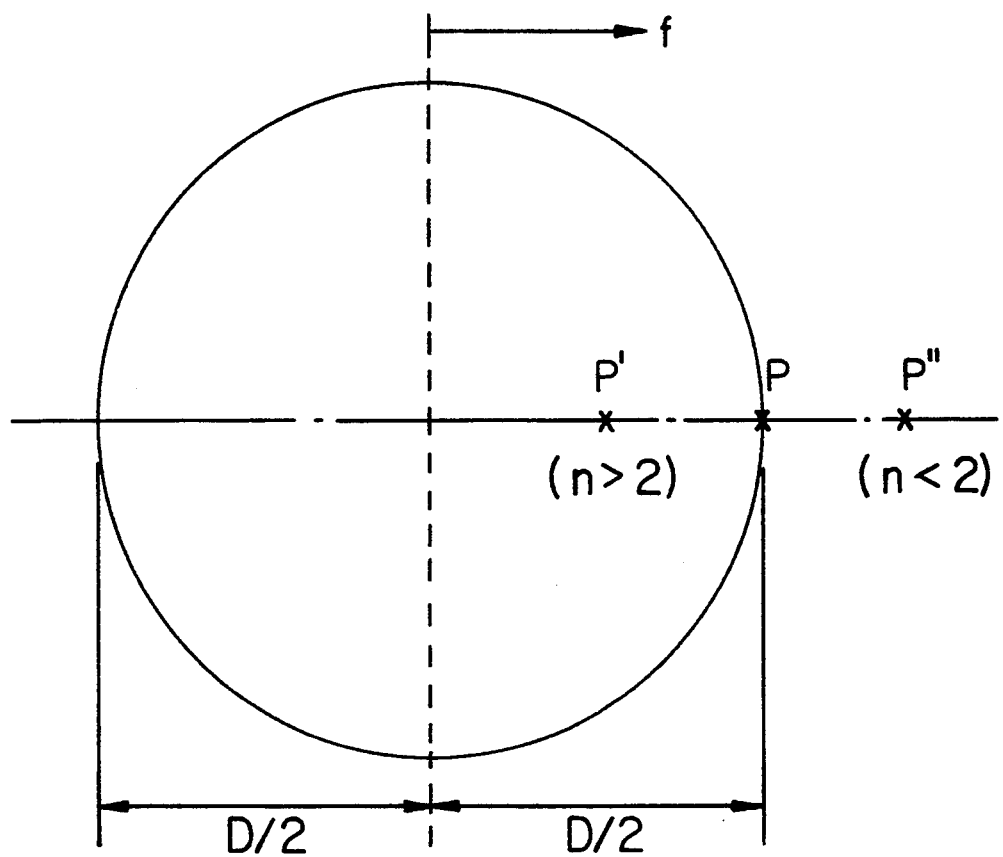
FIG. 6 is a schematic view of a ball lens illustrating the measurement of a focal length.

Since the principal plane of the ball lens 31 is a plane which passes through the center of the ball lens, as shown in FIG. 6, the focal length f is measured from the principal plane.

Accordingly, substituting n=2 in Formula (3), then f=D/2. In this case, the focal point is at point P on the surface of the ball lens 31. In the case of n>2, the value of f is smaller than that of the case of n=2, and therefore, the focal position is for example, at point P' internally of ball lens 31. In case of n<2, the focal position is at point P'' externally of the ball lens 31.

What is claimed is:

1. An optical fiber laser device for transmitting a pulse laser beam comprising a spherical lens made of optical glass having a refractive index of 2 or less provided at an extreme end portion of an optical fiber which guides a pulse laser beam, wherein an object side of said spherical lens projects externally of a base housing the spherical lens therein.

2. An optical fiber laser device for a pulse laser device, comprising a spherical lens made of optical glass having a refractive index of 1.516 provided at an extreme end portion of an optical fiber which guides a pulse laser beam, wherein an object side of said spherical lens projects externally of a base housing the spherical lens therein.

3. An optical fiber laser device, comprising:
   a base;
   a spherical lens housed in said base, said spherical lens having a refractive index no greater than 2 and having an object side projecting externally of said base; and
   an optical fiber for guiding a pulse laser beam, said optical fiber having an extreme end, and said spherical lens being positioned at said extreme end.

4. The optical fiber laser device of claim 3, wherein the refractive index of said spherical lens is 1.516.

5. The optical fiber laser device of claim 4, wherein a flexible tube has said base, said spherical lens and said optical fiber mounted therein by separators, and wherein said flexible tube and said base, said spherical lens and said optical fiber define a fluid passage therebetween.

* * * * *